April 18, 1967  W. S. PEPPLER  3,314,213
TRAY LOADING MACHINE
Filed March 27, 1964  4 Sheets-Sheet 1

INVENTOR
William S. Peppler
BY  Karl W. Flocks
ATTORNEY

INVENTOR
William S. Peppler
BY Karl W. Flocks
ATTORNEY

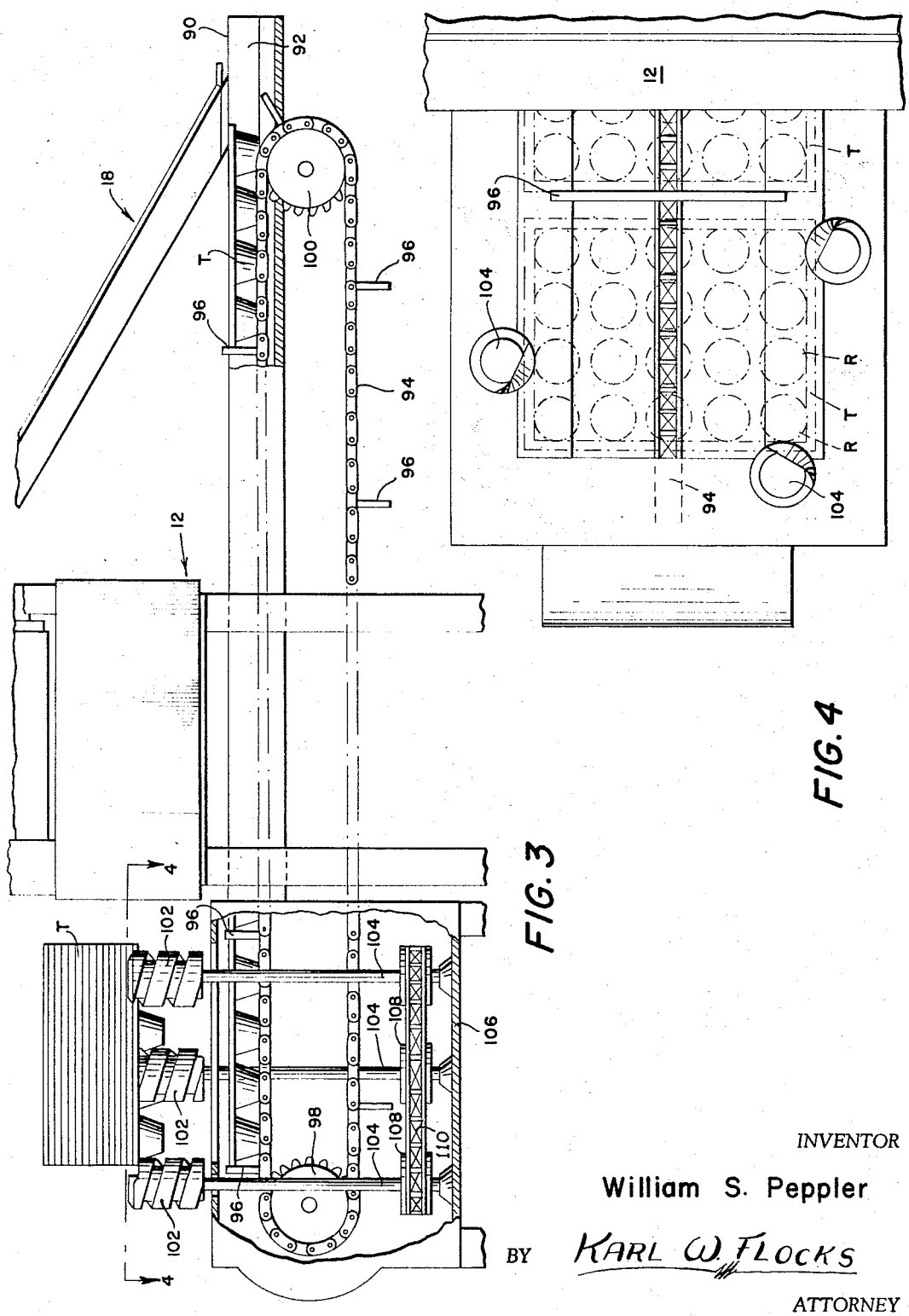

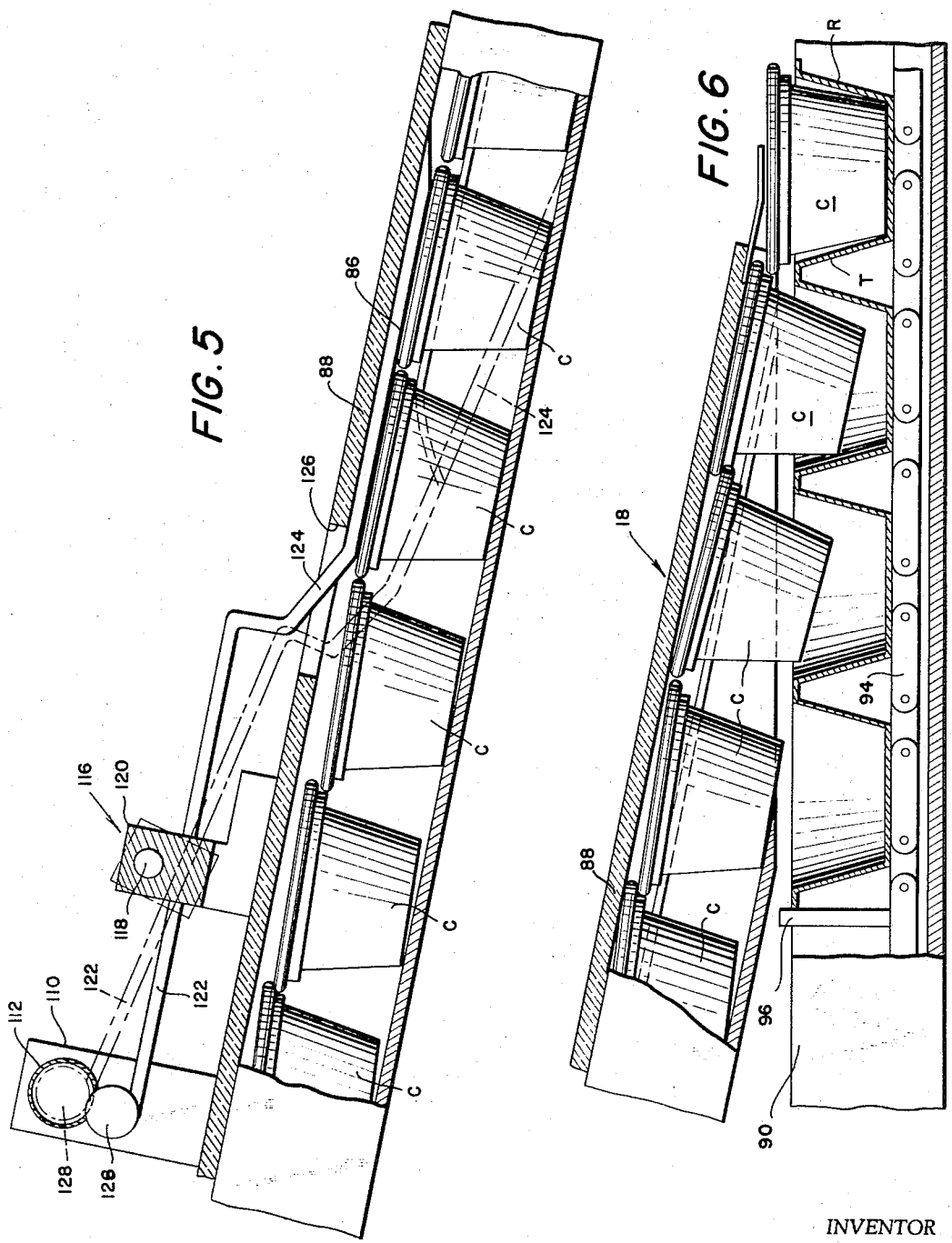

United States Patent Office 3,314,213
Patented Apr. 18, 1967

3,314,213
TRAY LOADING MACHINE
William S. Peppler, Chappaqua, N.Y., assignor to Diamond International Corporation, a corporation of Delaware
Filed Mar. 27, 1964, Ser. No. 355,179
11 Claims. (Cl. 53—62)

This invention relates generally to automatic loading equipment, and more particularly to apparatus continuously receiving a random supply of small articles such as cups or the like and automatically loading them into cellular trays.

Primary objects of the present invention are to provide novel apparatus which is relatively simple and substantially maintenance free; which will accept a plurality of randomly disposed cups; which will orient and maintain the cups in rows and direct them into a reservoir area; orient the cups in rows in a hopper area; which includes means for substantially stripping the cups onto a meshing cellular tray moving beneath the hopper area; and which will control movement of the cellular trays in relation to the number of cups accumulated in the hopper area so that the trays will not move unless there is a sufficient number of cups accumulated in a plurality of rows in the hopper area to fill all the rows of the tray.

Although an exemplary embodiment of the invention is disclosed herein, this embodiment discloses the invention only by way of example, and not by way of limitation.

Generally speaking, the apparatus includes means for conveying or directing a plurality of randomly disposed articles to a reservoir area or the like in which the articles are oriented into parallel rows and are subsequently directed to a hopper area into which the articles will accumulate, and in which means are provided for maintaining a sufficient number of these articles in the hopper area to fill all of the cells of cellular trays being conveyed beneath the hopper; the articles substantially mesh in the tray in the manner in which a gear and rack cooperate. The reservoir of the disclosed embodiment, for example, can be considered to be an integral portion of the hopper in which articles are accumulated as will be apparent to those skilled in the art.

Other and more specific objects and the nature and advantages of the present invention will become apparent from a consideration of the following description taken in conjunction with the accompanying drawings forming a part thereof, wherein:

FIG. 3 is a vertical section taken substantially on the plane of line 3—3 of FIG. 1, showing details of the cellular-tray conveyor and tray-dispensing mechanism in relation to the cup hopper;

FIG. 4 is a fragmentary top plan view taken substantially on the plane of line 4—4 of FIG. 3;

Figure 1:
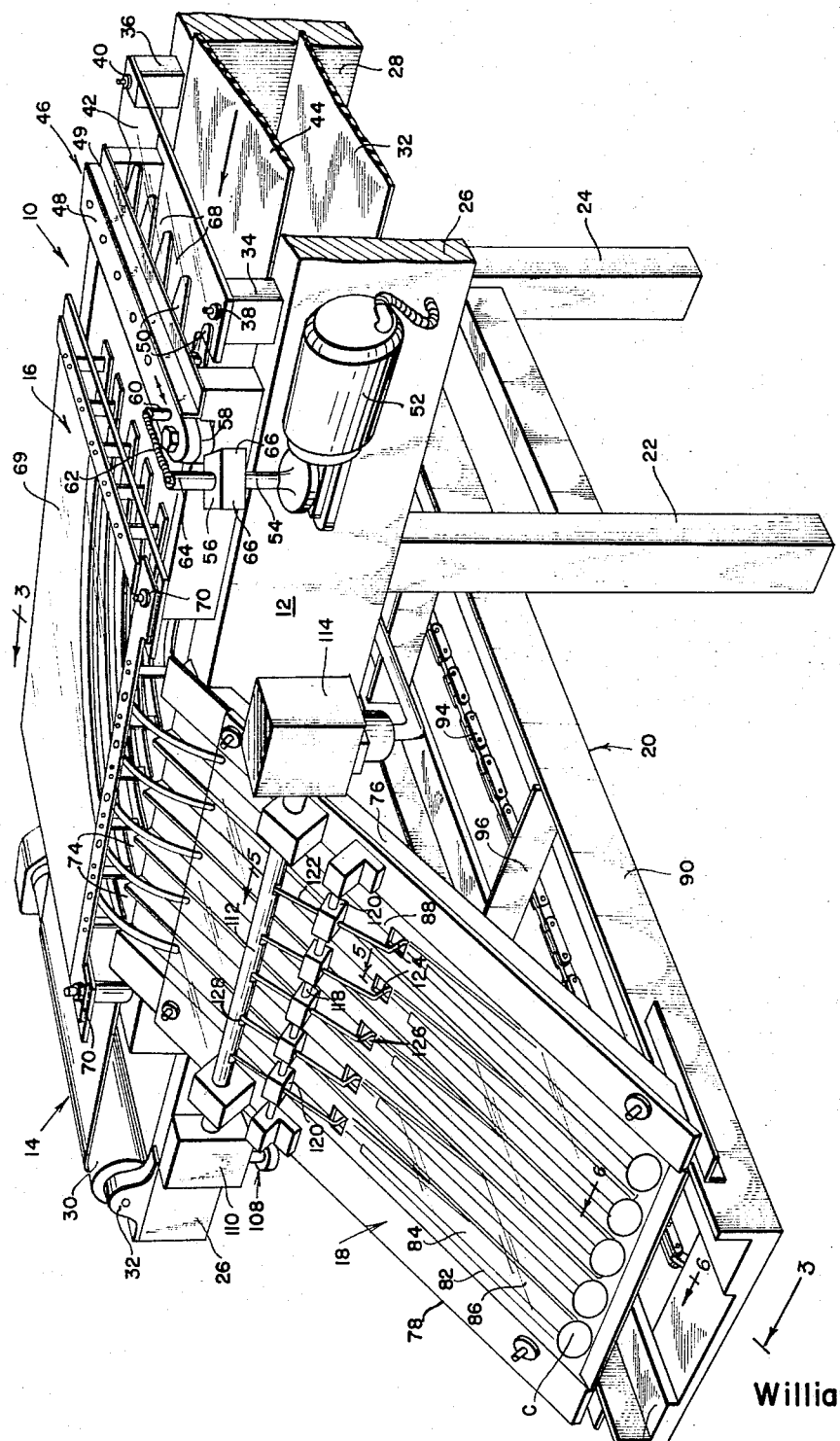
FIG. 1 is a perspective view of a tray loading machine illustrating the invention, a portion of the cup conveyor and frame being removed.
Figure 2:
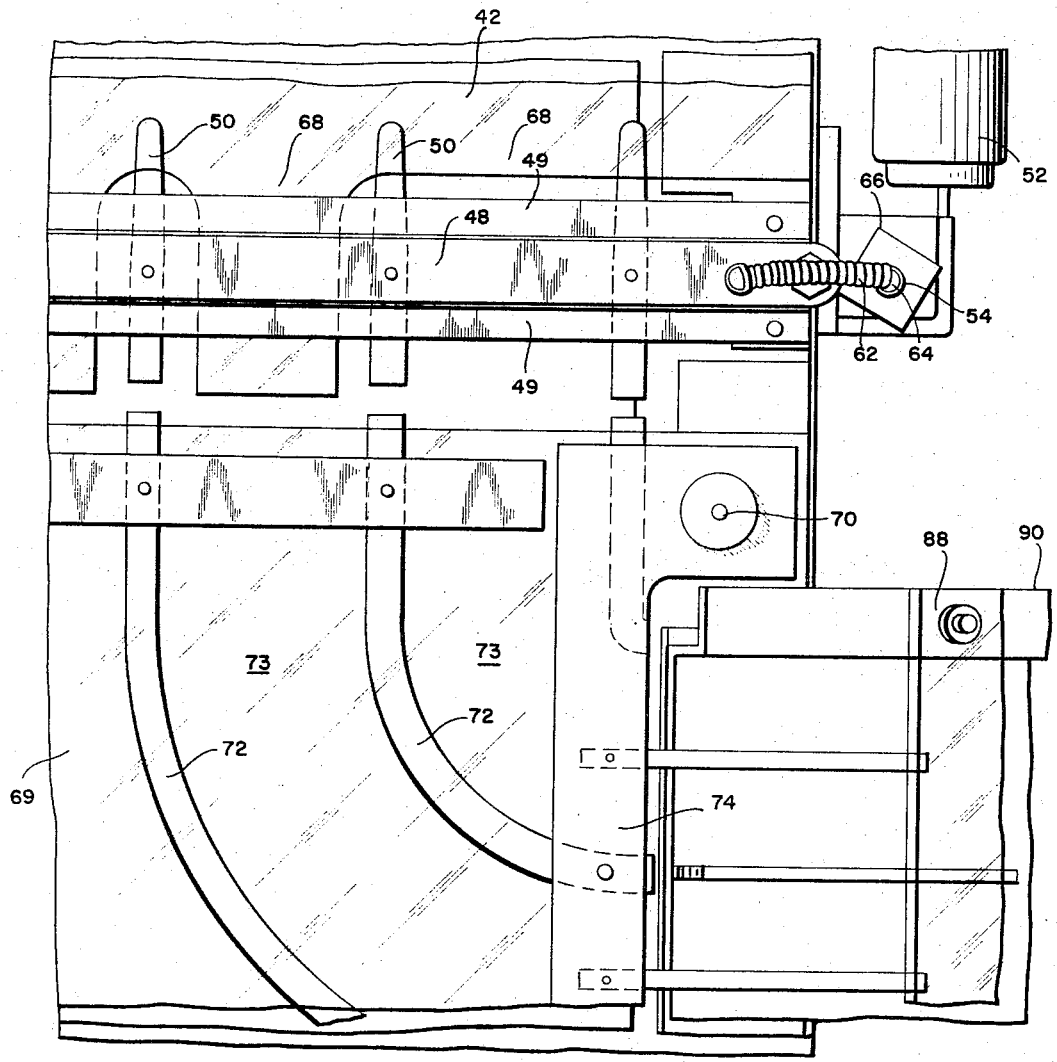
FIG. 2 is an enlarged, fragmentary top plan view of the machine at the nearest corner of FIG. 1, showing details of the cup reservoir and means for orienting random cups in rows and maintaining the cups in coplanar relation.

FIG. 5 is an enlarged, fragmentary vertical section taken substantially on the plane of line 5—5 of FIG. 1 through the cup hopper, and illustrating alternate positions of a control mechanism controlling operation of the cellular-tray conveyor; and FIG. 6 is an enlarged fragementary section taken substantially on the plane of line 6—6 of FIG. 1, and showing the manner in which the aligned rows of cups are stripped from the cup-hopper into a cellular tray.

Referring to the drawings in detail, and first considering FIG. 1, an exemplary embodiment of the tray loading machine is indicated generally at 10 and comprises a support frame 12 having mounted thereon a cup conveyor 14 underlying a cup-aligning reservoir 16 operatively related to a cup-hopper 18. Disposed beneath the support frame 12 and in intersecting relation with respect to the lower end of the cup-hopper 18 is a cellular-tray conveyor 20.

Although the cup-aligning reservoir 16 is disclosed as being offset with respect to the cup-hopper 18, it will be readily apparent to those skilled in the art, that the cup-alignment reservoir 16 may be incorporated or formed integral with the upper end portion of the cup-hopper, i.e. the upper portion of the cup-hopper forming the cup-aligning reservoir.

Additionally, as will subsequently be described, a cup shuffling assembly will be utilized at the entrance of the reservoir 16. In the event, the reservoir is integrated with the cup-hopper 18, the cup shuffling mechanism could also be incorporated in the upper end of the cup-hopper 18.

The support frame 12 includes suitable support legs 22 and 24 supporting therebetween side frame members 26 and 28 upon which is mounted the random-cup conveyor 14. The random-cup conveyor 14 includes transversely disposed rolls 30 (only one being shown) mounted in suitable bearings 32 on the support frame, and one of which will be power driven. Entrained over the rolls 30 is an endless conveyor belt 32 of any suitable low-friction material such as "Mylar" plastic or the like.

Suitably secured on mounting blocks 34 and 36 extending vertically from the side frame members 26 and 28 by means of stud-and-nut assemblies 38 and 40, respectively, is a guide sheet 42 preferably of Plexiglas or the like which is spaced a sufficient distance over the upper run 44 of the conveyor belt 32 to permit cups to readily pass therebeneath, maintain the cups in coplanar relation and prevent the cups from tipping over.

Indicated generally at 46 is a cup shuffling assembly which comprises a support bar 48 mounted between a pair of spaced angle elements 49 for reciprocable movement transversely of the direction of movement of the upper run of the belt which will be from right to left as indicated on FIG. 1. The mounting bar 48 has depending in spaced relation therealong, guide nose elements 50 which extend in the direction of movement of belt 32 and which will engage cups disposed at random on the upper surface of the run 44 of the conveyor to align them in rows. Mounted on the side frame member 26 is a motor 52 including a vertically extending power take-off shaft 54 which has intermediately fixed thereon a polygonal abutment element 56 which will engage an arcuate abutment-camming portion 58 fixed to the end of the mounting bar 48. The mounting bar 48 has a vertical extending stud or pin element 60 to which is secured one end of a tension spring 62, the other end of which being anchored at 64 of the upper end of the shaft 54. The spring 62 will urge the mounting bar 48 toward polygonal abutment element 56, and as the corner portions 66 of the abutment element engage the portion 58 of the mounting bar, the nose elements 50 will shuffle the randomly disposed cups and align them so that they pass between the nose elements 50 into passages 68.

The guide plate 42 is formed in separate sections, and a second section 69 thereof is suitably secured at 70 in overlying relationship to the conveyor run 44 and has depending therefrom a plurality of arcuate rail elements 72 forming guide channels 73 communicating with the rear ends of the channels 68 formed by the nose elements 50 for receiving the aligned rows of cups and directing them laterally to the channel exit portions 74 of the guide channels. The conveyor 32 due to its constant movement will carry five rows of cups therealong and oncoming cups will engage the cups in the channels 73 and urge them out of the exit portion 74 into guide portions of the cup hopper 18.

The cup hopper 18 comprises an inclined gravity type conveyor or chute including side frame members 76 and 78 having secured thereto a plurality of transversely spaced, elongated pairs of track elements 82 and 84 which form therebetween passages 86 for receiving the cups C. Overlying the track elements 82 and 84 is a sheet member 88 of plastic or the like which will restrain the cups from moving upwardly out of the channels of passages 86.

The cellular-tray conveyor assembly 20 includes a support frame 90 having a tray guide channel 92 through which cellular trays T will be conveyed and filled with cups as they pass beneath the lowermost intersecting end of the cup hopper 18. The cellular-tray conveyor assembly 20 includes thereon an endless conveyor chain 94 having transverse abutment bars 96 secured thereto and projecting outwardly therefrom for engaging a rear edge of a tray T; see FIGS. 1, 3 and 4. The endless chain 94 is entrained over suitable transversely disposed, tooth support rolls 98 and 100 journaled on the support frame 90. Disposed at the side of the support frame 12 opposite the cup hopper 18 is a vertically extending tray-supply hopper (details of which are not shown), which includes therebeneath, see FIG. 3, separating screw-cam elements 102 which are mounted on vertically extending shafts 104 journaled on a suitable support member 106. The shafts 104 include intermediately thereof tooth wheels 108 over which is entrained a synchronizing chain 110 whereby simultaneous rotation of the separating cams 102 will occur. The separating cams 102 will be driven by any suitable means, preferably an electric motor operatively connected thereto, and as seen in FIG. 4, will engage a tray T at its peripheral edge. The trays T will have a plurality of rows of cells or compartments R and the rear edge thereof will be engaged by the abutment bars 96. Although not shown, as the conveyor chain 94 moves a predetermined distance, the operation thereof will be synchronized with the rotation of the shafts 104 to accordingly permit or cause a lowermost tray T to descend forwardly of one of the abutment bars 96. The rows of the recesses or compartments R will be in alignment with the channels 86 of the cup hopper 18 and as the tray passes beneath the hopper 18, see FIG. 6, the aligned rows of cups will mesh with the compartments R and the cups will be stripped from the hopper 18 somewhat in the manner in which a toothed wheel meshes with an endless chain or in the manner in which the gear and rack cooperate.

It is essential that the cup hopper 18 contain sufficient cups to fill each tray passing therebeneath. Provided on the cup hopper assembly 18 is a tray conveyor control assembly indicated generally at 109 and comprises in the present instance a photo-electric device which will be operatively connected into the circuit (not shown) controlling operation of the tray conveyor assembly 20. The control assembly 109 includes a light source 111 projecting a beam of light through a tubular member 112 to a target or light-responsive assembly 114. The circuit to the motor operating the conveyor assembly 20 will normally be closed and unfilled trays will be continuously directed toward the end of the hopper 18, however, in the event one of the rows of the hopper 18 does not contain sufficient cups, the light from source 111 will be interrupted and the conveyor assembly 20 will cease to operate until sufficient cups have accumulated in the hopper 18.

In order to accomplish this function, the control assembly 109 includes a plurality of sensing assemblies indicated generally at 116. The assemblies 116 include a pivot shaft 118 upon which is journaled a plurality of support block elements 120. The block elements 120 have extending transversely therethrough feeler or sensing lever or rod 122 which is counterbalanced to pivot in a clockwise direction as seen in FIG. 5, i.e. feeler portion 124 thereof is considerably longer than that portion which extends toward the tube 112. The portion 124 of the rod 122 extends through an aperture 126 in the plate 88 overlying channels 86 in which the rows of cups are disposed. As indicated in phantom lines, when the cups C are not present in one of the guide channels 86, the feeler portion 124 of the levers 122 will descend in a manner indicated, and the upper portion of the rods 122 will be moved toward the tube 112. The rods 122 include on the uppermost end vertically extending disc or flag elements 128 which will be received in a lower slotted portion 128 of the tube 112 and interrupt the light being transmitted from the source 111 to the target 114. When this occurs, conveyor assembly 20 will not operate. However, the conveyor 32 upon which cups are disposed in random, will continue to operate and direct cups to the hopper assembly 18. After a sufficient number of cups have accumulated in the channels 86, and all of the flag elements of the different assemblies 116 are disposed in the solid line position shown in FIG. 5, the conveyor chain 94 will be caused to move the trays T past the lower end of the hopper assembly 18 to strip the cups C into the tray compartments R.

Thus there has been disclosed a tray loading machine which will accept randomly disposed cups or similar articles from the endless conveyor 32, direct them to the shuffling assembly 46 where they are disposed in alignment in a reservoir; succeeding cups pushing the aligned cups into the hopper assembly 18 where they are maintained in aligned relationship in the channels 86. At the same time, trays are fed one-by-one by means of the screw cams 102 onto the endless conveyor 94 and cups will be stripped continuously and automatically from the hopper assembly 18 into the compartments R to the trays T. Additionally, means are provided for interrupting the operation of the conveyor 94 in the event any of the channels of the assembly 18 are deficient or lack a sufficient number of cups to fill a tray passing therebeneath.

The cup-shuffling mechanism 46 upstream of the cup-aligning reservoir 16 which in turn communicates with the upper end portion of the cup-hopper 18, can all be incorporated or made integral with (although not shown) the upper end portion of the cup-hopper 18.

Positionable directional terms, or the recitation of the cup-hopper 18 as including the reservoir and the shuffling mechanism, are to be considered to be given their broadest interpretation within the purview of the prior art.

It will be obvious to those skilled in the art that various changes may be made without departing from the spirit of the invention and therefore the invention is not limited to what is shown in the drawings and described in the specification but only as indicated in the appended claims.

What is claimed is:

1. A tray loading machine comprising conveyor means for receiving a plurality of randomly disposed articles thereon and continuously moving the articles in a common direction, article reservoir means overlying said conveyor means including space guide portions for positioning said random articles in aligned rows, article hopper means communicating with said article reservoir means and including guide channels through which aligned rows of articles are directed, and cellular tray-conveyor assembly means disposed beneath said article hopper means in intersecting relation with said hopper means for stripping articles from said hopper means into a cellular tray carried by said tray-conveyor assembly, said first mentioned conveyor means comprising an endless conveyor, said article reservoir means including a guide plate above said endless conveyor for maintaining articles in a relatively fixed horizontal plane, said guide plate including a plurality of rows of depending guide elements for receiving and aligning articles therebetween.

2. In a tray loading machine as set forth in claim 1 in which said article hopper means includes article sensing means intermediately of and operatively associated with each of said guide channels, said article sensing means controlling operation of said tray-conveyor assembly to prevent operation thereof when less than a sufficient number of articles have accumulated in said hopper means to fill a cellular tray on said tray-conveyor assembly.

3. The structure of claim 1 including a power-operated article shuffling assembly overlying said endless conveyor forwardly of said rows of guide elements and including a plurality of transversely spaced guide nose elements aligned with said rows of guide elements.

4. The structure of claim 1 in which said article hopper means comprises a downwardly inclined, gravity-feed chute communicating laterally with said reservoir means.

5. The structure of claim 4 in which said tray conveyor assembly means comprises a second endless conveyor disposed in intersecting relationship beneath the lower end of said downwardly inclined chute.

6. The structure of claim 5 including cellular-tray dispensing means overlying said tray-conveyor assembly and including means for depositing cellular trays thereon.

7. The structure of claim 2 in which said sensing means comprises a plurality of feeler assemblies, one of each of said feeler assemblies overlying each of said guide channels, a photo-electric control assembly operatively connected to said tray-conveyor assembly for permitting trays to be moved beneath said guide channels when a predetermined number of articles are disposed in said guide channels, said feeler assemblies each including an intermediately pivoted rod overlying said guide channels and including at one end a foot portion normally extending into said guide channels for engagement with articles disposed therein, said rods each including a flag portion at the end opposite said foot portion and positionable in a control position with respect to said photo-electric control assembly due to the absence of articles in any one of said guide channels.

8. A tray loading machine comprising
means for receiving and conveying a plurality of randomly disposed articles and continuously moving the articles in a common direction,
said means for receiving and conveying said articles including article reservoir means for accumulating said randomly disposed articles as they are moved in the common direction,
said means for receiving and conveying said articles including article hopper means for conveying articles downstream of said article reservoir means and including guide channels for receiving aligned rows of articles therethrough, said article reservoir means including a guide plate above said means for receiving and conveying articles for maintaining said articles in a single plane,
said guide plate including a plurality of rows of depending guide elements for receiving and aligning said random articles in aligned rows between said guide elements, and a power-operated article shuffling assembly overlying said means for receiving and conveying articles, said power-operated shuffling assembly including a plurality of transversely spaced guide nose elements aligned with said row of guide elements.

9. The structure as claimed in claim 8 in which said means for receiving and conveying articles comprises a downwardly inclined, gravity-feed chute defining a path of travel for the articles.

10. The structure as claimed in claim 9 including a tray conveyor assembly comprising an endless conveyor having an upper run disposed in intersecting relationship beneath the lower end of said downwardly inclined, gravity-feed chute.

11. The structure as claimed in claim 10 including cellular-tray dispensing means overlying said tray-conveyor assembly and including means for depositing cellular trays on the upper run thereof.

References Cited by the Examiner
UNITED STATES PATENTS

| | | | |
|---|---|---|---|
| 1,142,136 | 6/1915 | Bates | 53—246 X |
| 2,834,169 | 5/1958 | Stuart | 53—246 |
| 2,968,899 | 1/1961 | Holmes | 53—61 X |

TRAVIS S. McGEHEE, *Primary Examiner.*

P. H. POHL, R. ALVEY, *Assistant Examiners.*